United States Patent [19]

Hollrock

[11] 3,773,433
[45] Nov. 20, 1973

[54] EXTENDIBLE ROTOR BLADE FOR ROTARY WING AERIAL DEVICE

[75] Inventor: Richard H. Hollrock, Simsbury, Conn.

[73] Assignee: Kaman Aerospace Corporation, Bloomfield, Conn.

[22] Filed: Aug. 18, 1971

[21] Appl. No.: 172,772

[52] U.S. Cl..................... 416/87, 416/140, 416/142
[51] Int. Cl. ............................................ B64c 27/50
[58] Field of Search ................. 416/87–89, 140, 142

[56] References Cited
UNITED STATES PATENTS

| 2,021,470 | 11/1935 | Upson ............................. 416/87 X |
| 2,108,245 | 2/1938 | Ash ................................... 416/88 |
| 2,163,482 | 6/1939 | Cameron ........................... 416/88 |
| 2,713,393 | 7/1955 | Isacco ............................... 416/88 |

Primary Examiner—Everette A. Powell, Jr.
Attorney—Roger B. McCormick et al.

[57] ABSTRACT

An extendible rotor blade for a rotary wing aerial device includes telescoping inner and outer blade sections with the outer section being movable relative to the inner section from a retracted to an extended position under the influence of centrifugal force as the blade rotates. A substantially non-resilient stretchable member between the two blade sections stretches beyond its elastic limit as the outer section moves to its extended position thereby absorbing energy and slowing the movement of the outer section to reduce the impact load which would otherwise occur upon engagement of the limit stops if the outer section were permitted to move freely relative to the inner section.

8 Claims, 4 Drawing Figures

PATENTED NOV 20 1973 3,773,433
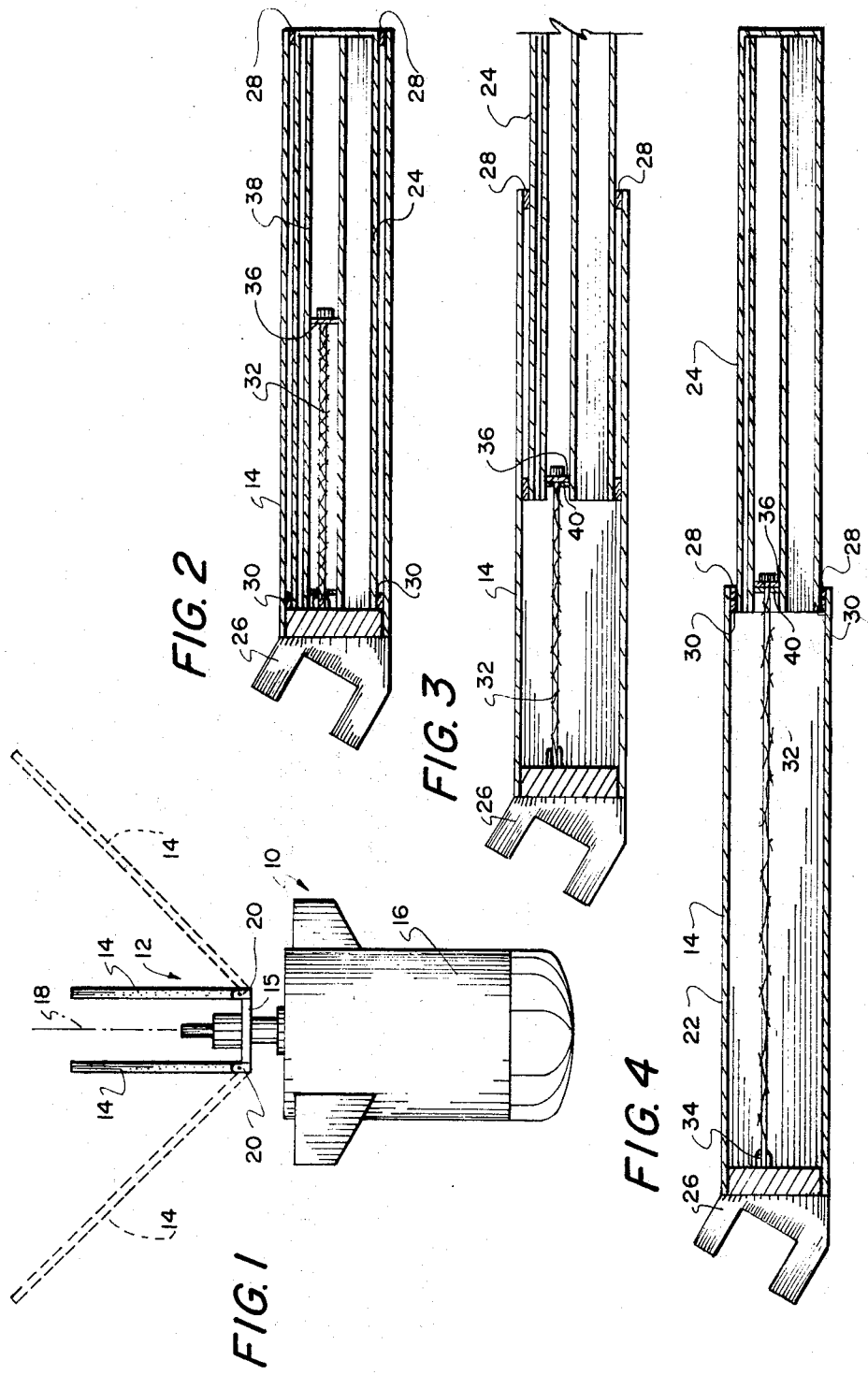
INVENTOR.
RICHARD H. HOLLROCK
BY
McCormick, Paulding & Huber
ATTORNEYS

EXTENDIBLE ROTOR BLADE FOR ROTARY WING AERIAL DEVICE

BACKGROUND OF THE INVENTION

This invention relates to a rotor blade used as a rotary wing in a rotary wing aerial device, and deals more particularly with such a rotor blade which is extendible in length.

Various different types of extendible rotor blades have been proposed in the past for rotary wing aircraft such as helicopters and autogyros and for other rotary wing aerial devices such as those including rotors in place of a parachute for retarding the descent of a container or other item dropped from an aircraft and desired to be landed relatively softly onto the earth. Another proposed application has been in connection with ejectable aircraft seats wherein the blades may form a rotor used to retard the descent of the seat and its occupant after its ejection from the aircraft. In this latter case the blades may be initially stowed in folded positions and moved to active positions immediately following ejection, and the rotor may be in some instances controllable by the seat occupant to control the direction of movement of the seat.

Extendible rotor blades are particularly desirable in the descent retarding type of aerial device used for aerial drops and ejection seats since the blades of such a device are usually, prior to use, folded to a stowed position parallel to the axis of rotation, the blades being movable to operative positions by centrifugal force after launching of the device. By making the blades extendible the space required for storage can be greatly reduced.

One common form of extendible rotor blade is one made up of two or more telescoping sections. One problem with such telescoping blades, however, particularly if used as part of a descent retarding device, is that if the radially movable sections are allowed to move freely from their retracted to their extended positions as the rotor starts to rotate, severe impact loads usually occur as the movable sections reach their limited positions and the stops and other parts of the blades have to be designed to withstand high impact loads even though the steady centrifugal forces thereafter exerted on them are much lower.

The general object of this invention is, therefore, to provide a telescopically extendible rotor blade wherein the occurrence of high impact loads when a telescopic blade section reaches its outwardly limited position is eliminated or at least drastically reduced so as to allow parts of the blade to be designed for lighter loads. A more particular object is to provide an extendible rotor blade comprised of at least two telescoping sections and an energy absorbing device connected between the two sections for slowing the outward movement of the outer section so that when the extended position of the outer section is reached the blade stops between the two sections engage one another relatively softly.

A still further object is to provide an extendible rotor blade of the foregoing character which may be readily designed to reach a certain desired length at a given rotor rpm and particularly to reach its maximum length at a desired rpm.

SUMMARY OF THE INVENTION

This invention resides in an extendible rotor blade comprised of inner and outer telescoping sections. The inner section is adapted to be connected with and restrained against radial outward movement relative to a hub, and the other section is telescopically movable relative to the inner section between a retracted position and an extended position. Movement of the outer section from its retracted position to its extended position is accomplished by centrifugal force as the rotor increases its rate of rotation. Co-engaging blade stops are provided on the two blade sections for limiting the outward movement of the outer section to its extended position, and an energy absorbing means is connected between the two blade sections to slow down the movement of the outer section during at least the final portion of its movement and to thereby cause the blade stops to engage one another in a relatively soft manner. The energy absorbing means is part, such as an annealed steel cable, which is relatively nonresilient and designed to be stretched beyond its elastic limit by the outward movement of the outer blade section as the outer section moves to its extended position. Preferably, a lost motion connection is made between this stretchable member and one or the other of the two blade sections so that as the outer section moves from its retracted position it may move for some distance freely of the inner section before its outward movement is resisted by the stretchable member.

BRIEF DESCRIPTION OF THE DRAWINGS

FIG. 1 is an elevational view of an aerial device using a rotor with blades embodying the present invention.

FIG. 2 is a longitudinal sectional view taken through one of the blades of FIG. 1 and showing the outer section of the blade in its retracted position.

FIG. 3 is similar to FIG. 2 but shows the outer section of the blade in an intermediate position relative to the inner section.

FIG. 4 is similar to FIG. 2 but shows the outer section of the blade in its fully extended position.

DESCRIPTION OF THE PREFERRED EMBODIMENT

Turning now to the drawings, FIG. 1 shows an aerial device, indicated generally at 10, having a rotor 12 with two blades or rotary wings 14, 14 and a hub 15 to which the blades are connected. Attached to the rotor 12 is a container 16, and the purpose of the rotor is to retard the descent of the container 16 as the device is dropped to the ground from an aircraft. In this figure the solid lines show the blades 14, 14 in a stowed or folded position in which they are arranged generally parallel to the axis 18 of rotor rotation. The broken lines show the blades in the deployed positions assumed during operational flight of the device through the air.

The blades 14, 14 of the rotor are non-rotating at the time of launch from the delivery aircraft and are designed to be brought into rotation by the impact of the air thereagainst following launch, the rotation thus occurring producing centrifugal forces which moves the blades about their coneing axes 20, 20 relative to the hub toward the illustrated deployed positions. Various details of blade construction and ancillary mechanisms concerned with the initiation of rotation following launch are well known in the art and need not be described as by themselves they form no part of the present invention. It will, however, be noted from FIG. 1 that the blades 14, 14 are extendible and in their deployed or broken line positions are of substantially greater length than in their stowed or solid line positions.

FIGS. 2, 3 and 4 show the construction of one of the blades 14 of FIG. 1. Referring to these figures, the illustrated blade 14 comprises an inner section 22 and an outer section 24 both of which are of an airfoil shape. The inner section 22 has its inner end fixed to a grip 26 or other similar part for connecting the blade to the hub. The outer section 24 fits telescopically within the inner section 22 and is slidable relative to the latter section between a retracted position shown in FIG. 2 and an extended position shown in FIG. 4. Movement of the outer section outwardly beyond its extended position is prevented by co-engaging blade stops. These blade stops may take various different forms but in the illustrated case are shown to comprise a pair of stops 28, 28 fixed to the outer end of the inner section 22 and a pair of stops 30, 30 fixed to the inner end of the section 24.

It will be evident from FIGS. 2, 3 and 4 that as the blade rotates centrifugal force acting on the outer blade section 24 will urge it to its extended position. If no restraint to such movement were provided, the outer section 24 would in most cases tend to move very rapidly towards its extended position causing the stops 28, 28 and 30, 30 to violently engage and to cause high impact loads to be imposed both on the stops and other parts of the blade sections. To avoid this impact loading, the illustrated blade 14 also includes an energy absorbing means for slowing the outer section during its extending movement.

In FIGS. 2, 3 and 4 the illustrated energy absorbing means comprises an elongated stretchable member made of relatively nonresilient material which is designed to be stretched beyond its elastic limit as the outer section of the blade moves through at least the final phases of its extending movement. In the illustrated case, this stretchable member is an annealed steel cable 32. The inner end of the cable is fixed relative to the inner blade section 22 by being fixed to the grip 26 as at 34. The outer end of the cable 32 has an enlarged head 36 which may be formed by a suitable attachment anchored to the cable. The head 36 is slidably received in a guide tube 38 forming part of the outer blade section 24 and extending longitudinally thereof. At the inner end of the tube 38 is a stop 40 through which the cable 32 freely passes. This construction, therefore, provides a lost motion connection between the cable 32 and the outer blade section 24 whereby the outer section in moving from its retracted position may move some distance freely of the inner section 22 without being restrained by the cable. Thereafter, the head 36 of the cable engages the stop 40 of the outer section and further outward movement of the outer section is obtained only by concomitant stretching of the cable.

FIG. 3 shows the intermediate position of the outer blade section 24 at which the head 36 of the cable first engages the stop 40 of the outer blade section during movement to the extended position. In this case the cable 32 has such a length that the outer section moves about half way from its retracted position toward its extended position before the cable is brought into play. It will be obvious, however, that by changing the length of the cable 32 and/or by changing the position of the stop 40 lengthwise of the guide tube 38 any desired amount of free travel of the outer blade section may be provided.

Also, by properly selecting the size of the cable 32 in both its diameter and length it is possible to selectively control or adjust the rotor rpm at which the outer section of the blade will move to its fully extended position or the rotor rpm at which the outer section of the blade will reach some other less than fully extended position. That is, the diameter of the rotor at different rpm's may be controlled by proper design of the cable or other stretchable part used in the blade construction.

I claim:

1. A rotary wing aerial device of the type comprising a body and a rotor connected to said body for rotation about a given axis relative to said body, said rotor having a plurality of foldable blades movable between folded positions located relatively close to said axis and operative positions at which they extend generally radially outwardly from said axis, said device being intended for deployment with said blades initially in said folded positions with said blades during deployment moving from said folded positions to said operative positions, further characterized by each of said blades being a telescopic blade including an inner blade section, an outer blade section telescopically carried by said inner section or movement radially outwardly relative to said inner section from a retracted to an extended position under the influence of centrifugal force as said blade rotates, and an energy absorbing means between said two blade sections for slowing the movement of said outer section during at least a portion of its movement from said retracted position to said extended position, said energy absorbing means including an energy absorbing member connected between said blade sections so as to be stretched beyond its elastic limit and to thereby absorb energy by plastic elongation as said outer section moves to said extended position.

2. A rotary wing aerial device as defined in claim 1 further characterized by co-engaging stop means on said inner and outer blade sections for limiting the movement of said outer blade section to said extended position.

3. A rotary wing aerial device as defined in claim 1 further characterized by said energy absorbing member being an elongated part having one end fixed relative to one of said two blade sections and having its other end adapted to move with the other of said blade sections during at least the final portion of the movement of said outer section toward its extended position.

4. A rotary wing aerial device as defined in claim 3 further characterized by said elongated part being made of annealed steel.

5. A rotary wing aerial device as defined in claim 3 further characterized by said elongated part being an annealed steel cable.

6. A rotor blade for a rotary wing aerial device, said rotor blade comprising: an inner blade section, an outer blade section telescopically carried by said inner section for movement radially outwardly relative to said inner section from a retracted to an extended position under the influence of centrifugal force as said blade rotates, an energy absorbing means between said two blade sections for slowing the movement of said outer section during at least a portion of its movement from said retracted position to said extended position, said energy absorbing means including an energy absorbing member connected between said blade sections so as to be stretched beyond its elastic limit and to thereby absorb energy as said outer section moves to said extended position, and a means providing a lost motion connection between one of said blade sections and said energy absorbing member whereby said outer section is capable of moving freely from said retracted position to an intermediate position with stretching of said energy absorbing member occurring only as said outer section moves from said intermediate position to said fully extended position.

7. A rotor blade for a rotary wing aerial device, said rotor blade comprising: an inner blade section, an outer blade section telescopically carried by said inner section for movement radially outwardly relative to said inner section from a retracted to an extended position under the influence of centrifugal force as said blade rotates, an energy absorbing means between said two blade sections for slowing the movement of said outer section during at least a portion of its movement from said retracted position to said extended position, said energy absorbing means including an energy absorbing member connected between said blade sections so as to be stretched beyond its elastic limit and to thereby absorb energy as said outer section moves to said extended position, said energy absorbing member being an elongated part having an inner end fixed relative to said inner blade section and an outer end located radially outwardly beyond the inner end of said outer section, an enlarged head on said outer end of said part, and stop means on said outer blade section which are located radially inwardly of said enlarged head when said second section is in its retracted position and which are brought into engagement with said head when said outer section is moved to a position intermediate its retracted and its extended position so that said outer section may move freely from its retracted to said intermediate position and movement of said outer section from said intermediate position to said extended position requires stretching of said part.

8. A rotor as defined in claim 7 further characterized by co-engaging stop means on said inner and outer blade sections for limiting the movement of said outer section to said extended position.

* * * * *